United States Patent [19]

Hammarstedt

[11] Patent Number: 4,507,921

[45] Date of Patent: Apr. 2, 1985

[54] THERMOSTATIC SENSOR AND METHOD OF MAKING SAME

[75] Inventor: Gosta Hammarstedt, Alstermo-SE, Sweden

[73] Assignee: Arcu Armaturindustri AB, Alstermo, Sweden

[21] Appl. No.: 496,181

[22] Filed: May 19, 1983

Related U.S. Application Data

[63] Continuation-in-part of Ser. No. 186,409, Sep. 11, 1980, abandoned.

[30] Foreign Application Priority Data

Sep. 17, 1979 [SE] Sweden .................................. 7907684

[51] Int. Cl.³ .............................................. F03G 7/06
[52] U.S. Cl. ..................................... 60/527; 236/99 K
[58] Field of Search .................... 236/99 R, 99 K, 100; 60/527, 530, 531

[56] References Cited

U.S. PATENT DOCUMENTS

| | | | |
|---|---|---|---|
| 1,523,951 | 1/1925 | Fulton | 92/34 X |
| 1,736,984 | 11/1929 | Sheats | 60/530 |
| 2,324,647 | 7/1943 | Ray | 60/531 |
| 2,722,451 | 11/1955 | Wilson | 60/530 |
| 3,319,532 | 5/1967 | Pridham, Jr. | 92/34 |
| 3,808,816 | 5/1974 | Lucus | 60/530 |

FOREIGN PATENT DOCUMENTS 458082 9/1968 Switzerland .................... 60/530

Primary Examiner—Allen M. Ostrager
Attorney, Agent, or Firm—Dann, Dorfman, Herrell and Skillman

[57] ABSTRACT

Thermostatic sensor for controlling radiator valves either directly or by remote control, comprising a cup-like metallic vessel (1) with a compressible plastic bellows (3) and a means (6) for effecting control movements in response to expansion or contraction of the bellows. The bellows is fabricated by blow-molding from a plastic preferably, an acetal plastic. The space between the vessel and the outside of the bellows is hermetically enclosed and filled with a wax medium (2) with high coefficient of thermal expansion. A sensor of this type is produced in one way by inserting wax in freely-fluid condition into the vessel (1), after which the bellows in compressed or sucked-together condition, preferably having expelled air from between the bellows walls thereof, is dipped down into the fluid medium and is there allowed to expand again, after which the vessel is closed by means of a washer or the like. Another way of producing the sensor is by dipping the bellows into a freely-fluid mass of wax while the bellows is compressed, and the wax is then allowed to solidify. The outside wax is shaped to conform to the inside of the vessel and is inserted in place and hermetically sealed.

3 Claims, 4 Drawing Figures

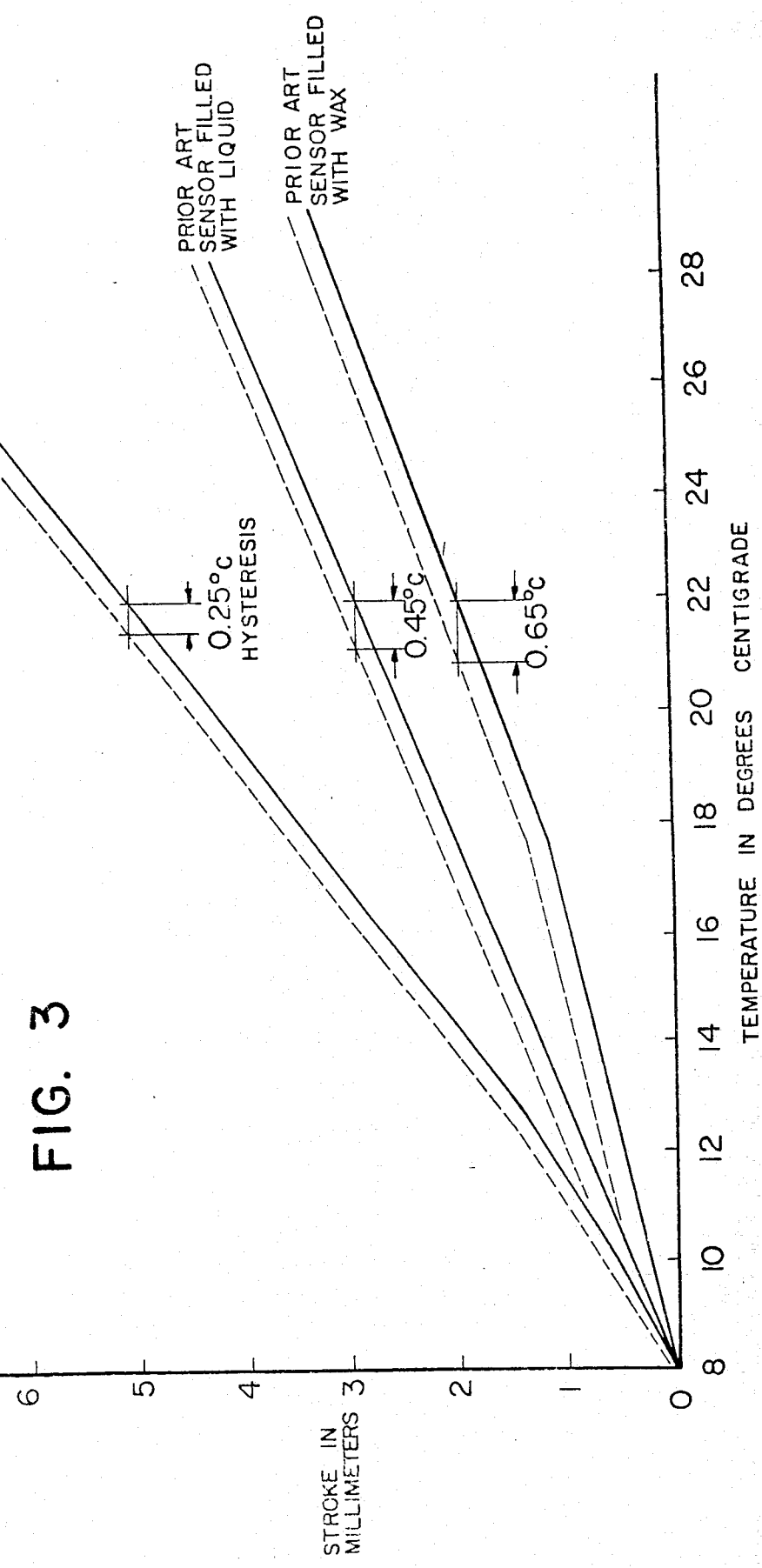

THERMOSTATIC SENSOR AND METHOD OF MAKING SAME

RELATED APPLICATION

This application is a continuation-in-part of my earlier U.S. patent application Ser. No. 186,409 filed Sept. 11, 1980, now abandoned.

FIELD OF THE INVENTION

The present invention concerns a thermostatic sensor for controlling or influencing valves and the like. The invention moreover concerns a method to produce a thermostatic sensor of the stated type.

BACKGROUND OF THE INVENTION

Thermostatic sensors of the present type are primarily designed for temperature-governing valves, e.g., radiator valves.

Several different embodiments of thermostatic sensors are already known, among others, sensors filled with gas, with liquid and with a wax-like filling of different compositions serving as an expansion medium.

The gas and liquid filled sensors contain elements such as ethyl ether, acetone or the like and in order to seal in their contents they have to be produced completely of metallic parts, which are soldered together. This is a very troublesome procedure, which raises the cost of manufacture considerably and nevertheless the result is a product which is sensitive to impacts, vibrations and similar disturbances, and which has a limited product life. Metallic bellows, for example not only are expensive but also must operate with a gas or a liquid which is of low viscosity and readily flows into and out of the crevices produced in the bellows. Furthermore metallic bellows tend to assume a permanent deformation. Apart from this, the handling of most of the gases and liquids in question present problems of hygiene and may be partially hazardous to health. The gas filled sensors moreover provide low adjusting power and limited stroke. The limited stroke is also a characteristic weakness of the liquid filled sensors.

In a sensor filled with wax of any type which produces a substantial stroke/°C. gives entirely too great a hysteresis effect owing to substantial internal friction determined by the composition of the wax. Such a known wax-filled sensor consists of a smaller and shorter non-elastic metallic vessel, the edges of which are flanged outward in order to clamp around a rubber diaphragm, which seals off the wax filling in the vessel, as well as to clamp around the flange of a tubular member, which mounts a piston at its free, outer end. Between the piston and the diaphragm a free rubber plug is arranged to transfer the thermostatic movements of the wax filling from the diaphragm to the piston. This is a complicated construction, which is sensitive to disturbances, and which of course, like all other known sensor constructions, is expensive to manufacture.

With reference to their applications in use, it can be said that gas and liquid filled sensors can be mounted directly onto the valve which is to be governed, and are also designed for remote control via a capillary tube. Previously known wax-filled sensors are not suitable for remote control and are therefore only available for assembly directly on a valve.

The functional requirements, which a good sensor at present preferably must fulfill are the following: substantial adjusting power; low hysteresis; limited dead time, i.e., the time it takes from the moment when a change of temperature begins to the moment when the sensor begins to react to the changed temperature; suitable time constant, i.e., the time it takes from the moment when the sensor begins to react to the changed temperature to the moment when it has set itself at a given percentage of the final value, e.g., 63% (for prior art radiator valves the time constant usually is 20-30 minutes); suitable range of control (for radiator valves a suitable range is e.g., 8°-26° C.)); and substantial applicability for remote control.

Besides these enumerated functional requirements, manufacturing requirements are also made, such as methods of production which allow simple, inexpensive and rapid mass production, as well as use of, from the standpoint by hygiene and health, safe components.

The previously known sensors do not fulfill all of these requirements.

SUMMARY OF THE INVENTION

The object of the present invention is therefore to bring forth a thermostatic sensor, which at least substantially fulfills all of the enumerated requirements. Moreover it is incumbent on the invention in additional respects to improve and further develop and advance the technology in this field.

These objects are achieved according to the present invention by a thermostatic sensor of the stated type having a blow-molded plastic bellows mounted in connection with a non-elastic vessel and having a wax with a high coefficient of thermal expansion disposed between said vessel and said bellows. A sensor of this type in an ideal manner in itself combines all of the aforesaid functional and manufacturing requirements and is relatively uncomplicated, so that simple, rapid and inexpensive manufacture and assembly is obtained.

The method according to the present invention is characterized by inexpensive and rapid mass production. Exact calculations have indicated that thermostatic sensors according to the invention can be produced at a cost amounting to only ⅓ to 1/5 of the cost for similar previously-known sensors.

Tests have shown, that the hysteresis in conventional wax-filled sensors amount to 0.6°-0.7° C., in conventional liquid-filled sensors to 0.3°-0.6° C., and in sensors according to the present invention to 0.2°-0.3° C., which shows the superiority of the invention. All of these values have been measured with a thermostat mounted on a radiator valve which means that the friction in the valve has also been considered in the comparison. The above stated differences are believed to be even greater in the sensor alone so that the invention is due even greater significance.

BRIEF DESCRIPTION OF THE DRAWINGS

Further features and advantages of the invention are revealed from the following detailed description with reference to the accompanying drawings, wherein:

FIG. 3 is a diagram which shows differences of efficiency between two previously-known thermostatic sensors and a thermostatic sensor according to the invention.

DETAILED DESCRIPTION OF THE PREFERRED EMBODIMENTS OF THE INVENTION

Figure 1:
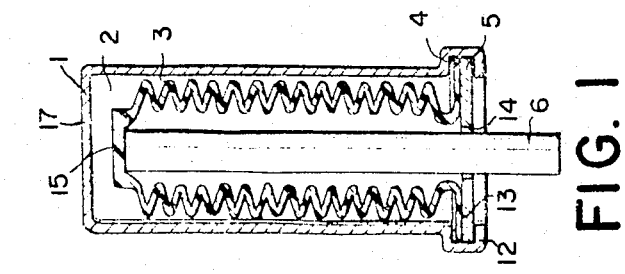
FIG. 1 is an axial cross-sectional view of a thermostatic sensor according to the invention adapted for direct assembly on a mechanical device, e.g., a valve.

The sensor shown in FIG. 1 for direct assembly on a valve (not shown) consists of a vessel 1 of non-elastic material, preferably metal, which suitably has a cup-like shape. The free edge 12 of the vessel has been flanged outward and then bent around to encircle and anchor first a ring-like gasket 4, second the flared free edge or open end 13 of a blow-molded plastic bellows 3, and third a washer 5 of suitable metal with a central hole 14 to accommodate a displaceable piston 6 which may be either plastic or metal. In the illustrated embodiment of the invention, the piston 6 is a straight, cylindrical rod, whose end which is located in the vessel 1 bears against and can be attached to the bottom 15 of the bellows 3. The bellows is closed at the bottom end and is flared outwardly at the outer end. At its closed end, the bottom 15 of the bellows 3 is parallel to and disposed in plane spaced from the bottom 17 of the vessel 1.

Figure 4:
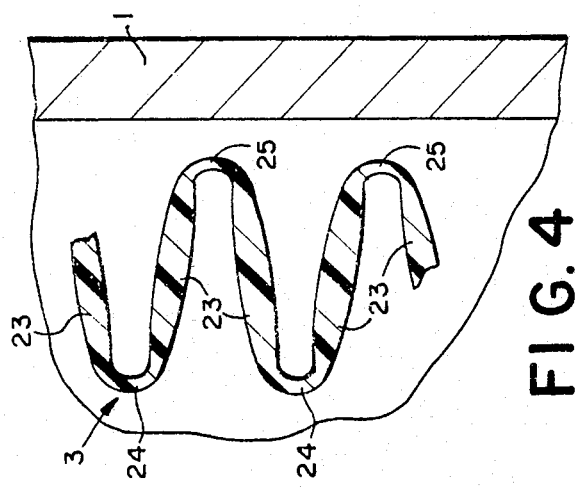
FIG. 4 is an enlargement of a part of the sectional view of FIG. 1, illustrating the configuration of the blow-molded plastic bellows therein.

In accordance with the invention, the bellows 3 is a blow-molded plastic, preferably acetal plastic, which is characterized, as illustrated in FIG. 4, by greater wall thickness in the annular conical wall 23 disposed between the inner and outer folds 24 and 25 than the thickness in the folds. The use of a blow-molded plastic bellows enables the bellows to function within a charge of wax which changes state within the preselected temperature range to which the sensor is sensitive. Not only is a blow-molded plastic bellows substantially less expensive than metal-formed bellows, but the plastic material of the bellows serves to insulate and retard the conduction of heat from the charge within the bellow's casing to the exterior parts where it may be dissipated. The greater wall thickness in the annular conical walls 23 operates when the bellows is compressed so that there is less resistance to the displacement of the material in the folds 24 and 25, and the annular conical walls 23 between the folds function spring-like so that the entire bellows functions like a series of cup springs. The selected plastic should have a large range of resilient deformation within the elastic limit, thereby affording substantially large stroke lengths in the plastic bellows as compared to the limited stroke lengths which are possible with metal bellows. In comparative tests in which the viscosity of the expansion medium has been chosen to render metallic bellows operative, it has been found that a plastic bellows made in accordance with the present invention has greater stiffness than a metal bellows and is therefore capable of transferring greater forces for actuating valves and the like. Furthermore, the stiffness of the blow-molded plastic bellows in most cases eliminates the need for return springs, and may be designed to avoid entrapment of the expansion medium between the walls 23.

While the inner space of the bellows 3 communicates with the atmosphere via the clearance between the piston 6 and the hole 14 which encircles the piston, the space between the bellows and the vessel is filled with a wax medium 2 of an intrinsically known type. A paraffin wax composition with low melting point can advantageously be used. Optimum conditions can be achieved through syntheses or separations of suitable wax compositions. As shown the inner folds 24 are offset both radially and axially from the outer folds 25, so that the walls 23 are generally conical. Because the configuration of the blow-molded plastic bellows 3, as discussed above, the selection of the wax may be made without concern for its ability or lack of ability to readily flow into small crevices and the like when it expands into its fluid state.

When the temperature in the wax medium 2 increases as a result of heating of the vessel 1, the wax medium transforms from solid state to fluid state and increases greatly in volume. When this occurs the bellows 3 is pressed together toward its collapsed condition and thereby pushes out the displaceable piston 6 to accomplish the intended control movement. When the temperature decreases, the circumstances become the opposite, and the bellows is displaced toward its expanded condition. If the piston is not attached to the bottom 15 of the bellows, a spring (not shown) can urge the piston back and hold it to bear constantly against the bottom of the bellows.

It is apparent that such a simple embodiment can also be produced rapidly, easily and inexpensively. The piston, the washer and the vessel can quickly and easily be mass-produced at extremely low costs, and further economies may be achieved if one makes use of standard components. The bellows is easy to mass produce through blow-molding in plastic, and with the use of a blow-molded plastic bellows neither does the selection of a suitable wax medium cause production problems of any kind.

With regard to assembly of the separate parts, additional advantages can be attained with the construction according to the present invention. Consequently, the bellows can according to one method be surrounded with wax composition in a mass exactly conforming to the circumference of the bellows, by dipping the bellows down into a mass of freely-fluid wax while the bellows are in either compressed or expanded condition, with or without a vibrating apparatus for the removal of air bubbles. When the wax cools to a solid state, it may be cut out or punched out to conform to the interior of the vessel 1, so that a unit consisting of the piston 6, washer 13, bellows 3, and wax mass 2 can easily be inserted into the vessel against the gasket 4 which is seated in the open end of the vessel. After insertion of the unit, the free edge 12, which is flanged outward and extended forward, simply and easily can be bent around to securely hold and anchor the described unit sealed against the gasket 4.

Owing to the combination of a bellows blow-molded of suitable plastic material and a wax filling, an extremely inexpensive and nevertheless completely reliable thermostatic sensor is obtained which has a substantial stroke and low hysteresis that are unparalleled. Even the dead time becomes considerably less than for previously known sensors.

A preferable method to manufacture and assemble a thermostatic sensor according to the invention is the following:

the vessel 1 is placed in a fixture (not shown) with vibrating apparatus for rapid removal of air bubbles from the wax to be inserted into the vessel. A suitable wax or a wax composition is poured into the fixture at such a temperature that the wax or wax composition is lightly or freely fluid, which preferably is the case at +30° C. Then the bellows 3 and the metallic washer 5 are mounted on a mandrel (not shown) with the aid of a source of suction, which also sucks the bellows together toward its collapsed condition. Preferably the bellows is compressed sufficiently to expel all of the air from between its walls 23 and outer folds 25, it being noted that in a blow-molded plastic bellows, such compression is readily effected by the reason of the differing wall thickness. The bellows and metallic washer are then inserted into the vessel, after which its flange 12 is pressed together around the metallic washer. This entire production and assembly procedure can occur automatically. When the under-pressure or suction has been cancelled, the bellows automatically expands in the vessel and thereby displaces the lightly or freely fluid medium from the bottom and center areas of the vessel and the expanding bellows causes the fluid medium to flow into the spaces between the walls 23 and the folds or corrugations 25 on the outside of the bellows. In this way a bubble-free entry of wax medium is guaranteed, which later according to the selected melting point reverts to semi-fluid or even solid state without causing any problems. The wax medium cannot, like liquid or gas, seep through the plastic bellows. Such seepage would make a sensor of this type more inefficient and in the end unusable.

The invention consequently is based partly on the understanding that a wax or a composite wax of the stated type principally cannot seep through the plastic bellows, and that a blow-molded plastic bellows has the lowest conceivable hysteresis and also the greatest conceivable stroke, and that the bellows can be surrounded by wax or a composite wax in fluid or semifluid state, so that after connection of a vibrating apparatus to the assembled unit, air inclusions are positively avoided. The invention takes advantage of the fact, that, especially for thermostats which are mounted directly on a radiator valve, as little heat transfer as possible occurs from the valve to the sensor, and, at the same time, that the thermostat is sensitive to external changes in temperature. These conditions are enhanced since, according to the invention, plastic, a material with low thermal conductivity, is suggested for the internal parts of the sensor, and metal, a meterial with high thermal conductivity, is suggested for the external parts of the sensor. Further advantages of a blow-molded plastic bellows, especially of acetal plastic, are its characteristics of a high endurance limit and good resilience.

Figure 2:
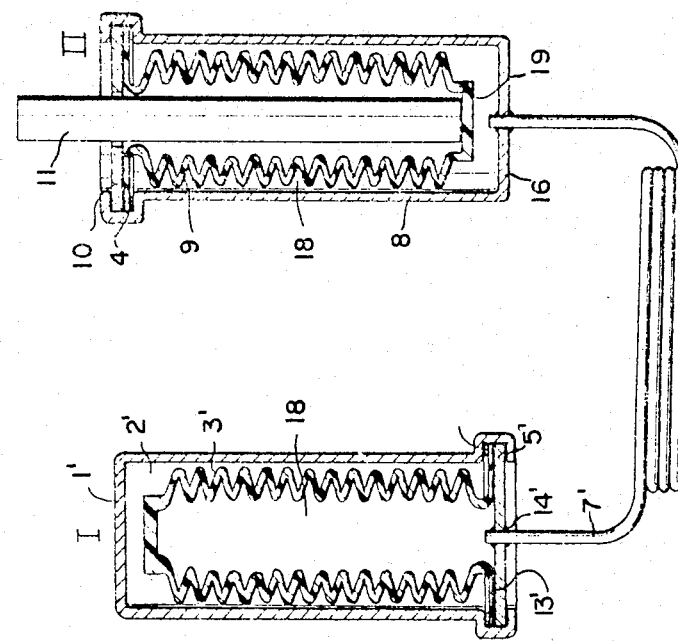
FIG. 2 is a axial cross sectional view of another embodiment of a thermostatic sensor according to the invention designed for remote control.

In FIG. 2 a modified sensor according to the invention is shown connected for remote control. The device is in two sections, identified by the reference characters I and II. The Section I serves as the local sensor, the Section II serves as the remote actuator. In this case, the embodiment shown in FIG. 1 is comparable to the sensor Section I shown to the left in FIG. 2, and the same parts have been identified with primed reference numbers. In the sensor Section I, the piston 6 is missing and the hole 14' (preferably smaller in size than hole 14) accommodates one end of a capillary tube 7, which extends into the vessel bottom 16 of the actuator Section II. The vessel 8 of the actuator Section II and its blow-molded bellows 9, as well as washer 10 and piston 11, suitably have the same design as the corresponding elements shown and described in connection with FIG. 1, but there is no wax medium between the bellows 9 and the vessel 8. The capillary tube 7 is fitted tightly and sealed in the washer 5' of the vessel 1' and in the bottom 16 of the vessel 8, e.g., by means by welding. The interior of the bellows 3' of the sensor vessel 1' however accommodates in this case a liquid or gas filling or transfer fluid 18, e.g., silicon oil, instead of a piston.

When changes of volume in the wax mixture 2' occur, the bellows 3' is influenced in the sensor Section I, so that it is compressed or is extended. This change is transferred via displacement of the filling or transfer fluid 18 through the capillary tube 7 to the actuator Section II. In this manner a compression or extension of the bellows 9 in the actuator section is obtained during compression or extension of the bellows 3' in the sensor section. The movement of the bellows 9 is transferred to the piston 11, which either can be attached to the bottom 19 of the bellows 9 or be held in contact with it with the help of a return spring.

FIG. 3 shows the clear superiority of a thermostatic sensor according to the invention with regard to its stroke and low hysteresis in comparison with both conventional liquid and wax filled thermostatic sensors. Preferably a wax composition for a sensor according to the invention is chosen so that the melting point of the mixture is in a range between +6° C. and +28° C., whereby the extra increase of volume caused by the melting gives an extra effect on the stroke of the piston. Naturally through the choice of the composition of the wax medium, a melting point can be obtained at almost any desired level of temperature and even wide intervals between the changed states of the composition, i.e., the transition from more solid to semi-fluid and further to light or freely fluid condition. A preferred wax medium changes from a solid to a semi-fluid state at the low end of said range and changes from a semi-fluid to a freely-fluid state at the upper end of said range.

The forms of the embodiment described above and illustrated in the drawings are to be considered as non-limiting examples, which can be modified and supplemented at will within the scope of the inventive idea and the following claims.

I claim:

1. A thermostatic sensor for use for remote control in a preselected temperature range, comprising a sensor section and an actuator section, each of said sections comprising a substantially non-elastic cup-like vessel with a compressible bellows consisting of a blow-molded plastic, and operable to be moved between expanded and collapsed limits, said blow-molded plastic bellows having a series of inner and outer folds connected by conical walls, said inner folds being radially and axially offset from the outer folds, the plastic in said conical walls being of greater thickness than the plastic in said folds, a washer with a gasket to hermetically seal the space between the vessel and the bellows in the sensor section and to close the space between the vessel and the bellows in the actuator section, and displaceable means displaced in response to movement of said bellows in the actuator section for the accomplishment of governing movements in a mechanical device, said hermetically-sealed space being filled with a medium with high coefficient of thermal expansion, said medium being a wax or a composite wax of a selected type which changes state within said preselected temperature range, the inner space of the bellows in the sensor section being filled with a transfer fluid, a capillary tube communicating said inner space with the closed space between bellows and vessel in the actuator section, said displaceable means comprising a piston in the actuator section inside of its bellows and extending outwardly through its washer.

2. A thermostatic sensor according to claim 1, characterized in that the preselected range includes the range between +6° C. and +28° C., said wax medium has a melting point in said range, a lower temperature in said range being the threshold between solid and semi-fluid states of the wax medium and an upper temperature in said range being the threshold between semi-fluid and freely-fluid states of the wax medium.

3. A thermostatic sensor according to claim 1, characterized in that the sensor vessel is heat-conductive and has a cylindrical form, said plastic bellows of the sensor section being closed at one end and open at the other end, said open end being flared outwardly, said gasket being annular and positioned on one surface of said flared end and said washer being rigid and positioned on the opposite surface of said flared end, said washer having a control hole to accommodate said capillary tube, the free edge of the cup-like sensor vessel being flanged outward and bent around to encircle and anchor said gasket, the flared open end of said bellows, and said washer.

* * * * *